(12) United States Patent
Yanagisawa

(10) Patent No.: US 8,395,846 B2
(45) Date of Patent: Mar. 12, 2013

(54) LENS SYSTEM AND DISPLAY DEVICE

(75) Inventor: Toshiyuki Yanagisawa, Suwa (JP)

(73) Assignee: Nittoh Kogaku K.K., Suwa-Shi, Nagano (JP)

( * ) Notice: Subject to any disclaimer, the term of this patent is extended or adjusted under 35 U.S.C. 154(b) by 94 days.

(21) Appl. No.: 13/133,705

(22) PCT Filed: Dec. 11, 2009

(86) PCT No.: PCT/JP2009/006812
§ 371 (c)(1),
(2), (4) Date: Jun. 27, 2011

(87) PCT Pub. No.: WO2010/067623
PCT Pub. Date: Jun. 17, 2010

(65) Prior Publication Data
US 2011/0249343 A1 Oct. 13, 2011

(30) Foreign Application Priority Data
Dec. 12, 2008 (JP) .................. 2008-316919

(51) Int. Cl.
*G02B 9/00* (2006.01)
*G02B 9/60* (2006.01)
*G02B 9/34* (2006.01)

(52) U.S. Cl. ......... 359/649; 359/650; 359/770; 359/783

(58) Field of Classification Search .......... 359/649–651, 359/770, 783
See application file for complete search history.

(56) References Cited

U.S. PATENT DOCUMENTS

| | | | |
|---|---|---|---|
| 5,774,279 A | 6/1998 | Kiriki et al. | |
| 5,822,128 A | 10/1998 | Sekine | |
| 6,473,244 B1 | 10/2002 | Sugano | |
| 7,057,830 B2 * | 6/2006 | Ebbesmeier | 359/755 |

FOREIGN PATENT DOCUMENTS

| | | |
|---|---|---|
| JP | 07-46556 | 2/1995 |
| JP | 07-58814 | 3/1995 |

(Continued)

OTHER PUBLICATIONS

PCT, International Search Report, International Application No. PCT/JP2009/006812 (mailed Jan. 26, 2010; published Jun. 17, 2010)).

(Continued)

*Primary Examiner* — William Choi
(74) *Attorney, Agent, or Firm* — Thompson Hine LLP

(57) ABSTRACT

There is provided a lens system (10) that projects projected light onto a screen (6) and includes, in order from the screen (6) side thereof, a first lens (L11) that is a meniscus-type lens with negative refractive power and is convex on the screen (6) side; a second lens (L12), a third lens (L13) and a fourth lens (L14) that are meniscus-type lenses with positive refractive power and are concave on the screen (6) side. In addition, the effective diameter of a concave surface (S6) of the third lens (L13) is larger than the effective diameter of the concave surface (S3) of the second lens (L12), the effective diameter of the concave surface (S8) of the fourth lens (L14) is larger than the effective diameter of the concave surface (S6) of the third lens (L13), and part of the convex surface (S7) of the third lens (L13) and part of the concave surface (S8) of the fourth lens (L14) are located in a shared space along the optical axis.

10 Claims, 5 Drawing Sheets

FOREIGN PATENT DOCUMENTS

| | | |
|---|---|---|
| JP | 9-222558 | 8/1997 |
| JP | 09-318876 | 12/1997 |
| JP | 2000-236375 | 8/2000 |
| JP | 2001-124987 | 5/2001 |
| JP | 2001-124988 | 5/2001 |
| JP | 2004-212729 | 7/2004 |
| JP | 2008-107798 | 5/2008 |

OTHER PUBLICATIONS

PCT, International Preliminary Report on Patentability, International Application No. PCT/JP2009/006812 (Jul. 14, 2011).

* cited by examiner

Fig. 3

| Surface | R | d | nd | vd | Effective diameter | Optical element | Focal length | Outer diameter |
|---|---|---|---|---|---|---|---|---|
| 0 | inf | 800.00 | | | | Screen | | |
| 1 | 78.100 | 1.940 | 1.4918 | 57.2 | 7.16 | Plastic lens L11 | -17.86 | 15.00 |
| 2 | 7.860 | 6.710 | | | 5.83 | | | |
| 3 | -29.505 | 1.500 | 1.84666 | 23.8 | 5.79 | Glass lens L12 | 40.67 | 13.00 |
| 4 | -16.335 | 6.960 | | | 5.87 | | | |
| 5 | inf | 3.570 | | | 5.55 | Stop | | |
| 6 | -88.275 | 5.260 | 1.4918 | 57.2 | 5.87 | Plastic lens L13 | 20.44 | 14.00 |
| 7 | -9.235 | 0.200 | | | 6.42 | | | |
| 8 | -14.310 | 0.830 | 1.80518 | 25.4 | 6.33 | Glass lens L14(L1) | 53.98(-13.21) | 15.00 |
| 9 | 44.135 | 5.120 | 1.7725 | 49.6 | 6.80 | (L2) | (12.78) | |
| 10 | -12.150 | Variable with focus | | | 7.25 | | | |
| 11 | ∞ | 1.050 | 1.51633 | 64.1 | | Cover glass CG | | |
| 12 | ∞ | 0.500 | | | | | | |

Fig. 4

| Surface | 1 | 2 | 6 | 7 |
|---|---|---|---|---|
| K | 8.7173 | -5.4026 | -10 | -0.18985 |
| A | 4.16800E-04 | 1.85200E-03 | -1.63900E-04 | 1.74500E-04 |
| B | -1.14630E-05 | -3.76240E-05 | -1.78620E-06 | -1.22530E-06 |
| C | 1.40800E-01 | 5.17300E-07 | 3.44070E-08 | 4.93730E-08 |
| D | -6.87200E-10 | -2.83500E-09 | -7.59700E-10 | -4.05400E-10 |

Fig. 5

| | | | |
|---|---|---|---|
| Focal length | | 12 | mm |
| F number | | 1.8 | |
| Back focus (in G) | | 22.91 | mm |
| Back focus (in air) | BF | 22.54 | mm |
| Lens length | LL | 32.09 | mm |
| Total lens length | | 55 | mm |
| Image height | | 5 | mm |
| Half field angle | | 22.8 | deg |
| Stop diameter | | 11.00 | mm |
| LL/BF | | 1.42 | |

Fig. 8

| Surface | R | d | nd | vd | Effective diameter | Optical element | Focal length | Outer diameter |
|---|---|---|---|---|---|---|---|---|
| 0 | inf | 800.00 | | | | Screen | | |
| 1 | 1102.826 | 1.540 | 1.4918 | 57.2 | 6.32 | Plastic lens L11 | −16.25 | 13.00 |
| 2 | 7.987 | 5.650 | | | 4.95 | | | |
| 3 | −24.270 | 2.520 | 1.92286 | 18.9 | 5.11 | Glass lens L12 | 35.19 | 11.50 |
| 4 | −14.726 | 2.430 | | | 5.47 | | | |
| 5 | inf | 4.080 | | | 5.25 | Stop | | |
| 6 | −16.281 | 2.510 | 1.53113 | 56.5 | 5.74 | Plastic lens L13 | 33.9 | 12.50 |
| 7 | −9.042 | 0.200 | | | 5.92 | | | |
| 8 | −22.591 | 0.800 | 1.80518 | 25.4 | 5.93 | Glass lens L14(L1) | 29.17(−10.93) | 14.00 |
| 9 | 16.414 | 5.360 | 1.816 | 46.6 | 6.38 | (L2) | (9.41) | |
| 10 | −12.501 | Variable with focus | | | 6.77 | | | |
| 11 | ∞ | 1.050 | 1.51633 | 64.1 | | Cover glass CG | | |
| 12 | ∞ | 0.5 | | | | | | |

Fig. 9

| Surface | 1 | 2 | 6 | 7 |
|---|---|---|---|---|
| K | 10 | 0.068886 | −2.97586 | 0.622798 |
| A | 2.03641E−03 | 2.53407E−03 | −3.30706E−05 | 4.24134E−04 |
| B | −5.21034E−01 | 2.39147E−05 | 1.97945E−06 | 1.26122E−06 |
| C | 5.83907E−07 | −3.25731E−06 | 2.60554E−07 | 1.88308E−07 |
| D | −2.32744E−09 | 6.03069E−08 | −3.06165E−09 | 1.26186E−09 |

Fig. 10

| Focal length | | 12 | mm |
|---|---|---|---|
| F number | | 1.9 | |
| Back focus (in G) | | 22.91 | mm |
| Back focus (in air) | BF | 22.54 | mm |
| Lens length | LL | 25.09 | mm |
| Total lens length | | 48 | mm |
| Image height | | 5 | mm |
| Half field angle | | 22.5 | deg |
| Stop diameter | | 10.50 | mm |
| LL/BF | | 1.11 | |

LENS SYSTEM AND DISPLAY DEVICE

TECHNICAL FIELD

The present invention relates to a lens system for use in a projector.

BACKGROUND ART

A light valve-based projector, which uses a light valve (a light modulating device) as an image generating device and projects light from a light source that has been modulated by such light valve onto a screen using a lens, and a CRT-based projector, which uses a display apparatus that emits light with high luminance such as a CRT as an image generating device and projects an image displayed on the display apparatus onto a screen using a lens, are known. Typical examples of a light modulating device are a liquid crystal panel and a DMD (Digital Mirror Device or Digital Micro Device). A DMD includes a plurality of elements that form an image by changing the direction of reflection of light.

Japanese Laid-Open Patent Publication No. 2004-212729 discloses a projection lens for use in a projector that is effectively composed of five lenses which, in order from the screen side to the image plane side, are a first lens made up of a single lens with negative refractive power, a second lens made up of a single lens with positive refractive power, a third lens with overall negative refractive power made up of a thirty-first lens with negative refractive power and a thirty-second lens with positive refractive power, and a fourth lens made up of a single lens with positive refractive power. Such projection lens is formed so as to be substantially telecentric toward the image plane side, and the surface on the image plane side of the first lens and the surface on the image plane side of the thirty-second lens are formed as aspherical surfaces.

DISCLOSURE OF THE INVENTION

A compact projector or compact information processing terminal including the function of a projector have been proposed. By using LEDs or the like, it is possible to produce a compact light source with high luminance, so that it is becoming possible to realize a projector that will fit onto the palm of the hand. To realize a compact projector, there is demand to make the lens (lens system) installed in a projector even more compact.

One aspect of the present invention is a lens system for projecting projected light onto a display medium, including in order from a side of display medium: a first lens that is a meniscus-type lens with negative refractive power and includes a convex surface on the side of display medium; a second lens that is a meniscus-type lens with positive refractive power and includes a concave surface on the side of display medium; a third lens that is a meniscus-type lens with positive refractive power and includes a concave surface on the side of display medium; and a fourth lens that is a meniscus-type cemented lens with positive refractive power and includes a concave surface on the side of display medium. The effective diameter of the concave surface on the side of display medium of the third lens is larger than the effective diameter of the concave surface on the side of display medium of the second lens. Also, the effective diameter of the concave surface on the side of display medium of the fourth lens is larger than the effective diameter of the concave surface on the side of display medium of the third lens. In addition, at least part of the concave surface of the fourth lens and at least part of the convex surface of the third lens are located in a shared space (common space) along the optical axis, with the convex surface of the third lens arranged so as to protrude into a space inside the concave surface of the fourth lens.

The lens system includes, in order from the side of display medium, a negative meniscus-type lens (the first lens) that is convex on the side of display medium and three positive meniscus-type lenses (the second to fourth lenses) that are concave on the side of display medium, and as a whole is a retrofocus type lens whose back focus length can be increased. In addition, by grouping three meniscus-type lenses with positive refractive power that are concave on the side of display medium, it is possible to form a light beam (light flux) that converges gradually and substantially monotonic or uniformly toward the side of display medium (i.e., toward the first lens). In addition, as the light rays included in the light beam widen (when looking from the side of display medium), the effective diameters of the concave surfaces of the plurality of positive meniscus lenses, that is, the surfaces on the side of display medium, can be increased in order from the side of display medium. Accordingly, the lens system includes a plurality of lens surfaces with a large area that effectively acts upon the light rays included in the light beam that converges from the fourth lens toward the first lens (i.e., that widens toward the fourth lens). This means that by using this lens system, it is possible to maintain a high brightness and to increase the area of the lenses that can be used to correct aberration. Accordingly, it is possible to provide a bright and compact lens system with a low F number and in which aberration is favorably compensated.

By grouping a plurality of meniscus lenses with concave surfaces that face the display medium, it is possible to use an arrangement where the convex surface of one lens protrudes into the space inside the concave surface of another lens and thereby reduce the lens length without reducing the number of lens surfaces. The lens system is arranged with the convex surface of the third lens protruding into a space inside the concave surface of the fourth lens.

In addition, by introducing a cemented lens, it is possible to improve the correction performance for chromatic aberration. In this lens system, by using a cemented type lens as the fourth lens in particular whose effective diameter is large, favorable correction performance is obtained for chromatic aberration while keeping the lens system compact.

Accordingly, it is possible to provide a compact lens system where the entire length LL from the convex surface of the first lens to the convex surface of the fourth lens and the back focus (in air) BF satisfy the following condition.

$$0.95 < LL/BF < 1.55 \quad (1)$$

When the value falls below the lower limit in the condition described above, the correction performance for spherical aberration is insufficient. On the other hand, when the value exceeds the higher limit in the condition described above, the lens system cannot be said to be compact relative to the back focus. As shown in the embodiments described below, it is possible to provide a lens system where LL/BF is 1.45 or below and also a system where LL/BF is 1.15 or below.

The outer diameter OD1 of the first lens, the outer diameter OD2 of the second lens, the outer diameter OD3 of the third lens, and the outer diameter OD4 of the fourth lens should preferably satisfy the following conditions.

$$0.85 < OD2/OD1 < 1.1$$

$$0.85 < OD3/OD1 < 1.1$$

$$0.85 < OD4/OD1 < 1.1 \quad (2)$$

By setting the outer diameters of the first to fourth lenses so as to fall within the ranges given above, it is possible to provide a lens system that is entirely cylindrical and makes efficient use of space, and is also bright and has a low F number.

It is possible to use plastic lenses as the first lens and the third lens and glass lenses as the second lens and the fourth lens. By alternately using plastic lenses and glass lenses, it is possible to suppress fluctuations in the aberration-correcting performance due to temperature. Also, by introducing a suitable number of plastic lenses and making one or both surfaces of the plastic lenses aspherical, it is possible to improve the aberration-correcting performance. In particular, by using a glass lens as the fourth lens that has potentially the largest outer diameter, the fourth lens can be a cemented-type lens and reduce the difference between the outer diameter and the effective diameter, which is effective in making the entire lens system compact.

Another aspect of the present invention is a display apparatus including the lens system described above and an image generating device that generates images to be projected by the lens system. By making the lens smaller, it is also possible to miniaturize the display apparatus. It is also possible to provide an information processing terminal including such display apparatus and a communication apparatus that is capable of transmitting and receiving data for image generation by the image generating device. Since it is possible to achieve a sufficiently long back focus length relative to the lens length, the lens system is suited to a display apparatus that uses, as an image generating device, a light modulating device including a plurality of elements that generate an image by changing the direction of reflection of light. One example of a display apparatus is a projector that displays images with a screen as a display medium. The display medium is not limited to a screen and the present invention can be applied to a variety of display apparatuses that project images onto a wall surface, a floor surface, printing paper, or the like.

BRIEF DESCRIPTION OF THE DRAWINGS

FIG. 3 shows lens data of the lens system shown in FIG. 2.

FIG. 4 shows aspherical surface coefficients of the lenses shown in FIG. 2.

FIG. 5 shows various numerical values of the lens system shown in FIG. 2.

FIG. 8 shows lens data of the lens system shown in FIG. 7.

FIG. 9 shows aspherical surface coefficients of the lenses shown in FIG. 7.

FIG. 10 shows various numerical values of the lens system shown in FIG. 7.

DESCRIPTION OF CARRYING OUT THE INVENTION

Figure 1:
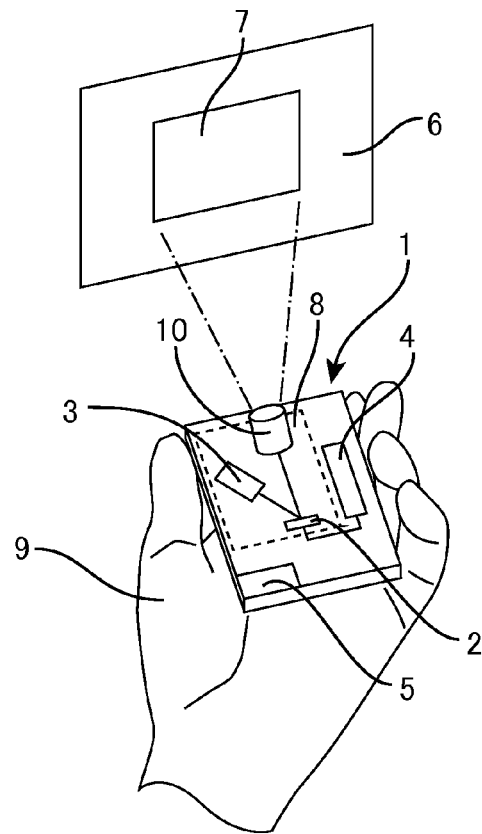
FIG. 1 shows the overall construction of a terminal in which a lens system is incorporated.

FIG. 1 shows the overall construction of an information processing terminal according to an embodiment of the present invention. The information processing terminal 1 is a terminal of a size that will fit onto the palm 9 of the hand. The terminal 1 includes a projector (display apparatus) 8 capable of displaying (projecting) an image 7 with a tabletop surface, wall surface 6, or the like as a screen (display medium). The projector 8 is not limited to using a wall surface and is also capable of displaying the image 7 on another surface, such as a projection screen made of fabric.

The projector 8 includes a lens system 10, an image generating device 2 that generates an image to be projected onto the display medium 6 by the lens system 10, and an illumination unit 3 for emitting projected light onto the image generating device 2. The image generating device 2 is a light modulating device (light valve) and as one example may be a DMD (digital mirror device) including a plurality of elements (micromirrors) that generate an image by changing the direction of reflection of light. The light valve 2 may alternatively be a liquid crystal device or the like. The illumination unit 3 includes a light source that outputs light of the three primary colors according to time division. As one example, the light source may be a combination of a light source such as white LEDs (light emitting diodes) and filters for splitting the light into colors. The light source may alternatively be LEDs of plurality of colors, EL (Electro Luminescence) elements, or the like.

The terminal 1 also includes a communication unit 4 that is capable of transmitting and receiving data for image generation by the image generating device 2 via a wireless or wired communication medium, such as a wireless LAN. The terminal 1 also includes a battery 5 for supplying power to the illumination unit 3 and the like.

Figure 2:
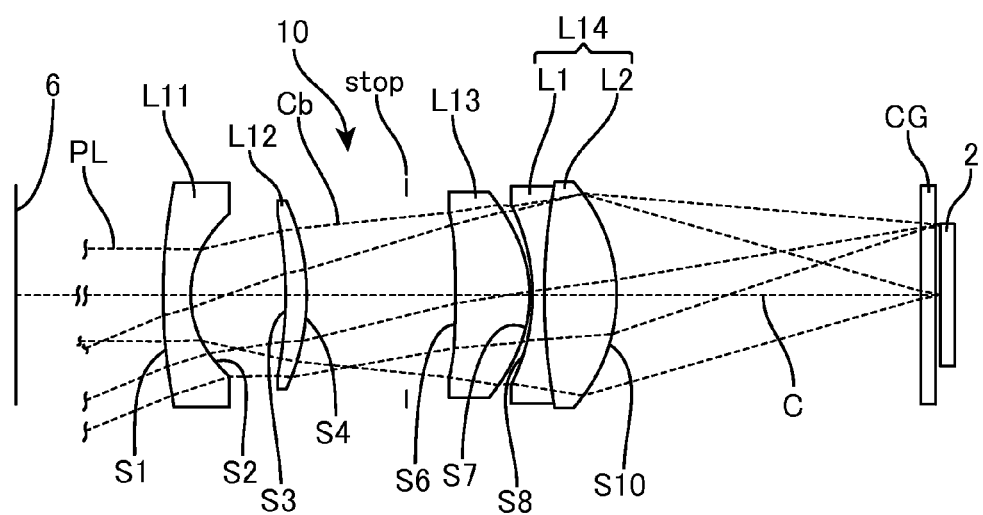
FIG. 2 shows the lens arrangement of a lens system.

FIG. 2 shows the lens system 10 in more detail. FIG. 3 shows data on the respective lenses. In the lens data in FIG. 3, "R" represents the radius of curvature (mm) of each lens surface disposed in order from the display medium (screen) side, "d" represents the length (mm) between the respective lens surfaces disposed in order from the screen side, "nd" represents the refractive index (d line) of each lens in order from the screen side, and "vd" represents the Abbe number (d line) of each lens in order from the screen side. In the data, "inf" indicates a flat surface. In addition, the effective diameter (mm) of each surface of each lens and the outer diameter (mm) of each lens are shown.

This lens system 10 is a system for projecting projected light PL onto the display medium 6, and in order from the display medium (screen) 6 side toward the light valve 2, is constructed of a first lens L11 that is a meniscus-type lens with negative refractive power and is convex on the screen 6 side, a second lens L11 that is a meniscus-type lens with positive refractive power and is concave on the screen 6 side, a third lens L13 that is a meniscus-type lens with positive refractive power and is concave on the screen 6 side, and a fourth lens L14 that is a meniscus-type cemented (or "balsam" or "doublet") lens with positive refractive power and is concave on the screen 6 side. The fourth lens L14 is a cemented lens composed of a negative biconcave lens L1 disposed on the screen side and a positive biconvex lens L2 disposed on the light valve side.

In addition, the effective diameter ED6 of the concave surface (screen-side surface) S6 of the third lens L13 is larger than the effective diameter ED3 of the concave surface (screen-side surface) S3 of the second lens L12. The effective diameter ED8 of the concave surface (screen-side surface) S8 of the fourth lens L14 is larger than the effective diameter ED6 of the concave surface S6 of the third lens L13. In addition, part of the concave surface S8 of the fourth lens L14 and part of the convex surface (light valve-side surface) of the third lens L13 are located in a shared space (common space) along the optical axis C. That is, the radius of curvature R7 of the convex surface S7 of the third lens L13 is smaller than the radius of curvature R8 of the concave surface S8 of the fourth lens L14 and the convex surface S7 of the third lens L13 is arranged so as to protrude into a space inside the concave surface S8 of the fourth lens L14.

For the lens system 10 for use in the compact projector 8 that fits on the palm 9 of the hand, there is demand not only for the lens length to be short but also for the ability to display high quality images on the display medium 6, which for example is a screen, a wall surface, a glass surface or the like. This means that there is demand for the lens system 10 to favorably correct various types of aberration such as chromatic aberration. In addition, there is demand for the lens system 10 to be a bright lens with a low F number in keeping with its small size.

The lens system 10 is composed of the negative meniscus-type lens L11 that is convex on the screen 6 side and the three lenses L12 to L14 that are positive meniscus-type lenses that are concave on the screen 6 side, and as a whole is a retrofocus-type lens that is a combination of negative and positive refractive powers from the screen 6 side and has a back focus length that can be increased. Accordingly, this system is suited to the lens system 10 of the projector 8.

In addition, in the lens system 10, from the screen 6 side, the lenses L11 to L14 are a combination of negative, positive, positive, and positive lenses, and the lenses L12 to L14 are disposed as a group of three meniscus lenses with suitable positive refractive powers (or three comparatively weak positive refractive powers) whose concave surfaces are on the screen 6 side. By using this arrangement of the lenses L12 to L14, it is possible to form a light beam Cb that gradually converges substantially uniformly or monotonously from the fourth lens L14 on the light valve 2 side toward the first lens L11 (i.e., the projected light widens from the concave surface of the negative first lens L11 toward the fourth lens L14).

Also, by disposing the three positive meniscus lenses L12 to L14 in a group with their concave surfaces facing in the same direction, it is possible for the effective diameters ED3, ED6, and ED8 of the concave surfaces S3, S6, and S8 on the screen sides of the lenses L12 to L14 to increase in order and/or uniformly or monotonously from the screen side. Accordingly, the light rays included in the light beam Cb that gradually widens from the screen 6 side toward the light valve 2 diverge and thought (cross, traverse) the respective surfaces of the three positive meniscus lenses L12 to L14, which makes it possible to use an arrangement where correction of aberration can be effectively carried out by the surfaces of the three positive meniscus lenses L12 to L14. For example, the respective surfaces of the positive meniscus lenses L12 to L14 are disposed in the manner of concentric circles facing the screen 6 (this does not mean that the centers of the circles are the same in reality) and the light beam Cb that has a principal ray that is the same of the optical axis C shown by the broken line in FIG. 2 as gradually widens toward the fourth lens L14 while being optically acted upon by the respective surfaces of the meniscus lenses L12 to L14 (i.e., the light beam Cb gradually converges from the fourth lens L14 toward the concave surface S2 of the first lens L11).

In addition, by disposing the meniscus lenses L12 to L14 in a group with the concave surfaces facing the screen 6 side, it is possible to use an arrangement where the convex surface S7 of the previous lens L13 protrudes into the space inside the concave surface S8 of the lens L14, thereby sharing limited space between the surfaces of a plurality of lenses. Accordingly, with the lens system 10, it is possible to shorten the lens length while maintaining the number of lens surfaces.

In the known lens system disclosed in Japanese Laid-Open Patent Publication No. 2004-212729, a negative, positive, negative, positive system is used. This means that in the known lens system, in addition to the light beam being narrowed by the negative lens closest to the screen, its effective diameter is also narrowed at the negative lens positioned before the positive lens that is closest to the light valve. A lens system where the effective diameter of the positive lens closest to the light valve is narrowed is also known (see for example Japanese Laid-Open Patent Publication No. 2008-107798). With such lens systems, even if it is possible to construct the lens systems using a low number of lenses, the effective diameters of the lenses are comparatively small, resulting in the lens systems being dark and having a high F number.

Unlike the known lens systems, in the lens system 10 according to the present embodiment, aside from the negative lens closest to the screen where the light beam is narrowed, the cross-section of the light beam Cb increases substantially uniformly toward the fourth lens L14 that is final (i.e., closest to the light valve 2). This means that it is possible to provide a lens system 10 that is bright and has a low F number, such as an F number of 2.0 or below or more preferably 1.9 or below.

In addition, since the respective surfaces of the lenses L12 to L14 are disposed with the concave surfaces facing a direction in which the light beam Cb, which increases substantially uniformly toward the final (i.e., closest to the light valve 2) fourth lens L14, increases, light rays that pass through the lenses L12 to L14 can diverge, which means the incident angles of the light rays are low and the light rays are easy to correct. Accordingly, it is possible to provide the lens system 10 that has a low number of lenses and high aberration-correcting performance. For example, by making some of the surfaces of the lenses L12 to L14 aspherical, it is possible to correct aberration even more effectively. In the lens system 10, both surfaces S6 and S7 of the lens L13 are aspherical.

In addition, since the negative lens 11 that is closest to the screen 6 is also a meniscus lens that is convex on the screen 6 side, the aberration-correcting performance can be improved. In addition, by making one of the surfaces of the lens L11 aspherical, it is possible to correct aberration even more effectively. In this lens system 10, both surfaces S1 and S2 of the lens L11 are aspherical.

In addition, by making the lens L14 closest to the light valve 2 a cemented-type lens composed of a negative lens L1 and a positive lens L2, the correction performance for chromatic aberration of the lens system 10 is further improved. In this lens system 10, the effective diameter of the fourth lens L14 is the largest. Accordingly, by making the fourth lens L14 a cemented lens, it is possible to improve the correction performance for chromatic aberration while making the lens system compact. Also, the lens L14 that is closest to the light valve 2 is a position that is susceptible to the effects of temperature (i.e., is comparatively susceptible to becoming hot) and is therefore suitable as a position for disposing a cemented-type lens where glass lenses are used.

In addition, compared to plastic lenses that are often manufactured by molding, the effective diameter ED of a glass lens can be set large compared to the outer diameter OD of the lens. Accordingly, by using a glass lens for the lens L14 into which the convex surface S7 of the third lens L13 protrudes, it is possible to prevent the outer diameter of the lens L14 from being larger than necessary. Therefore, using a glass lens as the lens L14 is also effective in making the size of the lens system in the diameter direction compact.

In the lens system 10, the ratios between the outer diameters OD2 to OD4 of the positive meniscus lenses L12 to L14 and the outer diameter OD1 of the negative meniscus lens L11, that is, OD2/OD1, OD3/OD1, and OD4/OD1, are respectively 0.87, 0.93, and 1.0. Accordingly, the outer diameters OD1 to OD4 of the first to fourth lenses are within the ranges of the conditions indicated by Equation (2) given earlier. Therefore, the lens system 10 is entirely cylindrical and makes effective use of space. In addition, since the effective diameters of the respective lenses are also large, the lens system 10 is also bright and has a low F number.

Also, in the lens system 10, plastic lenses are used as the first lens L11 and the third lens L13 and glass lenses are used as the second lens L12 and the fourth lens L14. By using plastic lenses and glass lenses alternately, it is possible to suppress fluctuations in the aberration-correcting performance due to temperature. Also, since aberration-correcting performance can be achieved more easily when the refractive index of the second lens L12 is high, it is preferable to use a glass lens where it is easier to achieve a high refractive index. In addition, the aberration-correcting performance of the plastic lenses L11 and L13 is improved by making both surfaces S1, S2 and S6, S7 of such lenses aspherical.

The aspherical surface coefficients of the respective surfaces S1, S2, S6, and S7 are shown in FIG. 4. The aspherical surfaces are expressed by the following expression using the coefficients K, A, B, C, and D with X as the coordinate in the optical axis direction, Y as the coordinate in a direction perpendicular to the optical axis, and the direction in which light propagates as positive. This is also the case for the following description.

$$X=(1/R)Y^2/[1+\{1-(1+K)(1/R)^2Y^2\}^{1/2}]+AY^4+BY^6+CY^8+DY^{10} \quad (3)$$

FIG. 5 shows various numerical values for the lens system 10. The numerical values in FIG. 5 include the combined focal length of the lens system 10, the F number, the back focus length including the cover glass CG, the back focus length (in air) BF that does not include the cover glass, a lens length LL from the screen 6 side of the first lens L11 to the light valve 2 side of the fourth lens L14, and the entire lens length that includes the lens length LL and the back focus BF. The ratio LL/BF of the lens length LL and the back focus BF of the lens system 10 is 1.45 or below, which falls within the range of the condition of Equation (1) given earlier. Accordingly, the lens system 10 is a compact lens system with a small lens length LL relative to the back focus length BF. As the actual size, the lens system 10 is an extremely small lens system where the lens length LL is around 32 mm and the maximum diameter is around 15 mm.

Figure 6:
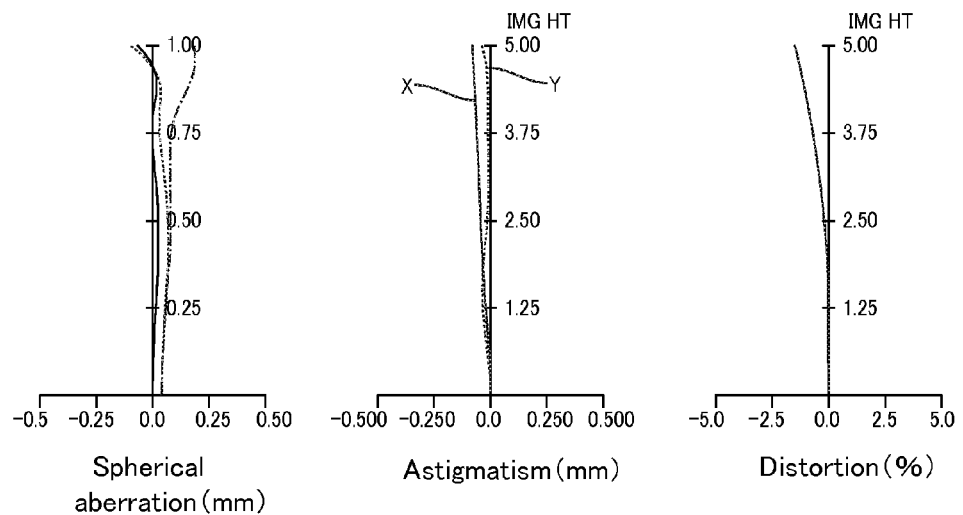
FIG. 6 shows longitudinal aberration of the lens system shown in FIG. 2.

FIG. 6 shows the spherical aberration, astigmatism, and distortion of the zoom lens system 10 by way of longitudinal aberration graphs. Values of the spherical aberration for the respective wavelengths of 650 nm (broken line), 520 nm (solid line), and 430 nm (dot-dash line) are shown. In addition, in the graph showing the astigmatism, aberration for tangential rays (X) and sagittal rays (Y) is shown. As shown in these drawings, the values of the various types of aberration are favorably corrected, which means that the lens system 10 has favorable optical performance.

Figure 7:
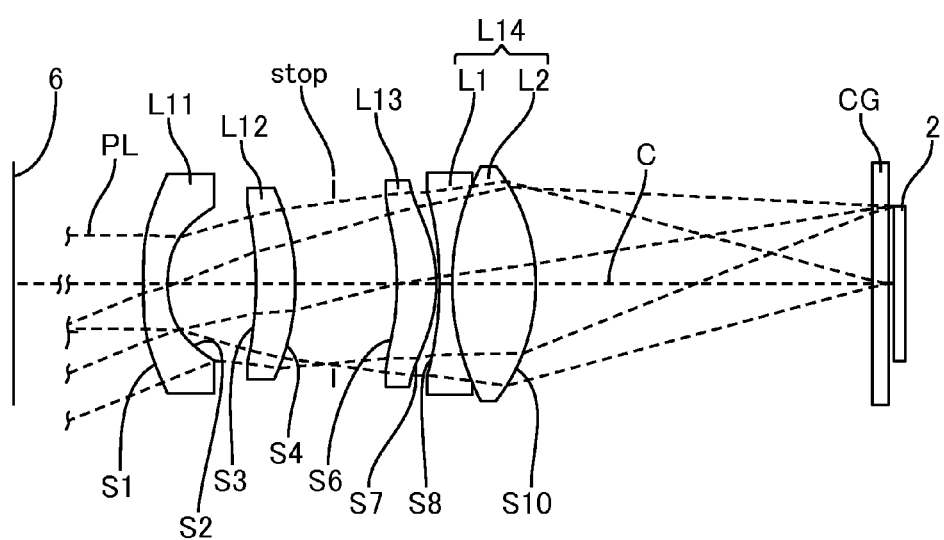
FIG. 7 shows the lens arrangement of a different lens system.

FIG. 7 shows a different lens system 10. FIG. 8 shows data on the respective lenses. The units of the respective numerical values are the same as in the example described above.

The lens system 10 is a system for projecting the projected light PL onto a display medium such as the screen 6. In order from the screen 6 side toward the light valve 2, the lens system 10 is constructed from a first lens L11 that is a meniscus-type lens with negative refractive power and is convex on the screen 6 side, a second lens L12 that is a meniscus-type lens with positive refractive power and is concave on the screen 6 side, a third lens L13 that is a meniscus-type lens with positive refractive power and is concave on the screen 6 side, and a fourth lens L14 that is a meniscus-type cemented lens with positive refractive power and is concave on the screen 6 side. The fourth lens L14 is a cemented lens composed of a negative biconcave lens L1 disposed on the screen side and a positive biconvex lens L2 disposed on the light valve side.

In addition, the effective diameter ED6 of the concave surface (the screen-side surface) S6 of the third lens L13 is larger than the effective diameter ED3 of the concave surface (the screen-side surface) S3 of the second lens L12. Also, the effective diameter ED8 of the concave surface (the screen-side surface) S8 of the fourth lens L14 is larger than the effective diameter ED6 of the concave surface S6 of the third lens L13. Part of the concave surface S8 of the fourth lens L14 and part of the convex surface (the light valve side surface) S7 of the third lens L13 are located in a shared space along the optical axis C. That is, the radius of curvature R7 of the convex surface S7 of the third lens L13 is smaller than the radius of curvature R8 of the concave surface S8 of the fourth lens L14 and the convex surface S7 of the third lens L13 is arranged so as to protrude into the space inside the concave surface S8 of the fourth lens L14.

This lens system 10 also is constructed of the negative meniscus-type lens L11 that is convex on the screen 6 side and the three positive meniscus-type lenses that are concave on the screen 6 side and as a whole is a retrofocus-type lens system that is a combination of negative and positive refractive powers from the screen 6 side. In the same way as the lens system 10 described earlier, the lens system is compact, bright, has a low F number, and has favorable correction performance for various types of aberration.

In this lens system 10, the ratios between the outer diameters OD2 to OD4 of the positive meniscus lenses L12 to L14 and the outer diameter OD1 of the negative meniscus lens L11, that is, OD2/OD1, OD3/OD1 and OD4/OD1, are 0.88, 0.96, and 1.08. Accordingly, the outer diameters OD1 to OD4 of the first to fourth lenses are all within the ranges of the conditions indicated by Equation (2) given earlier. Therefore, the lens system 10 is entirely cylindrical and makes effective use of space. In addition, since the effective diameters of the respective lenses are also large, the lens system 10 is bright and has a low F number.

Also, in this lens system 10, plastic lenses are used as the first lens L11 and the third lens L13 and glass lenses are used as the second lens L12 and the fourth lens L14. By using plastic lenses and glass lenses alternately, it is possible to suppress fluctuations in the aberration-correcting performance due to temperature. In addition, the aberration-correcting performance of the plastic lenses L11 and L13 is improved by making both surfaces S1, S2 and S6, S7 of such lenses aspherical.

The aspherical surface coefficients of the respective surfaces S1, S2, S6, and S7 are shown in FIG. 9. In the lens system 10, by providing a part of the third lens L13 close to the optical axis C with positive refractive power and a part distant from the optical axis C with substantially no refractive power or with a weak negative refractive power, the correction performance for aberration is further improved.

FIG. 10 shows various numerical values of the lens system 10. The ratio LL/BF of the lens length LL of the lens system 10 to the back focus length BF is 1.15 or below which sufficiently falls within the range of the condition indicated by Equation (1) given earlier. Accordingly, the lens system 10 is a compact lens system where the lens length LL is even shorter relative to the back focus length BF. As the actual size, the lens system 10 is an extremely small lens system where the lens length LL is around 25 mm and the maximum diameter is around 14 mm.

Figure 11:
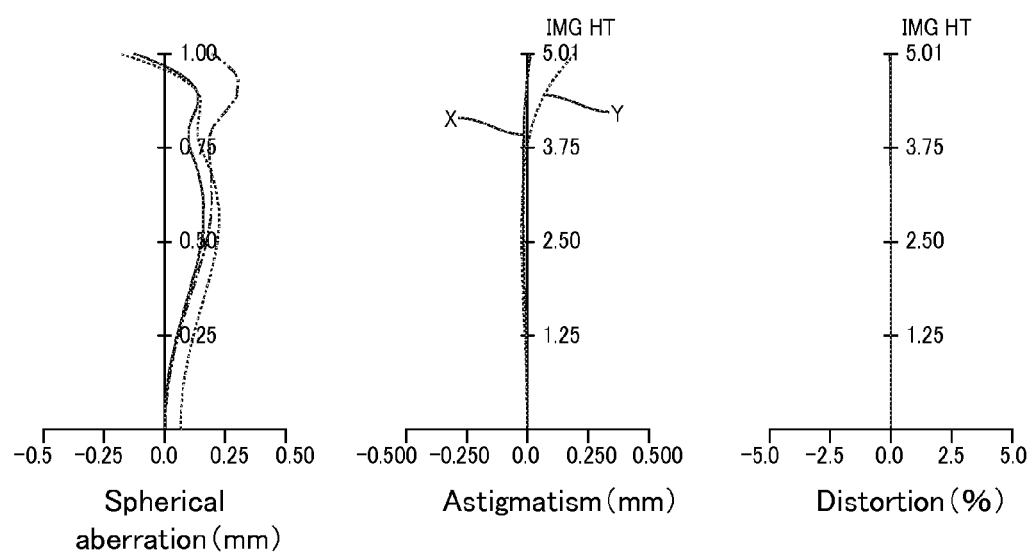
FIG. 11 shows longitudinal aberration of the lens system shown in FIG. 7.

FIG. 11 shows the spherical aberration, astigmatism, and distortion of the zoom lens system 10 by way of longitudinal aberration graphs. As shown in these drawings, the values of the various types of aberration are favorably corrected, which means that the lens system 10 has favorable optical performance.

As described above, the lens system 10 that has a four lens construction (where one lens is a cemented lens) is extremely bright with an F number of 2.0 or below and also has favorable aberration-correcting performance in spite of being extremely small with a lens length of around 30 mm or below. Accordingly, by using the lens system 10, it is possible to provide a compact projector 8 and/or terminal 1 that fits onto the palm of the hand and is capable of projecting bright and clear images onto a display medium such as the screen 6. By carrying the projector 8 together with a mobile information terminal or by incorporating the projector 8 into the information terminal 1, it is possible to project images easily onto a wall or other convenient surface as a display medium and use such images in a variety of applications.

The invention claimed is:

1. A lens system for projecting projected light onto a display medium, comprising in order from a side of display medium:
    a first lens that is a meniscus-type lens with negative refractive power and includes a convex surface on the side of display medium;
    a second lens that is a meniscus-type lens with positive refractive power and includes a concave surface on the side of display medium;
    a third lens that is a meniscus-type lens with positive refractive power and includes a concave surface on the side of display medium, an effective diameter of the concave surface being larger than an effective diameter of the concave surface of the second lens; and
    a fourth lens that is a meniscus-type cemented lens with positive refractive power and includes a concave surface on the side of display medium, an effective diameter of the concave surface being larger than the effective diameter of the concave surface of the third lens and at least part of the concave surface and at least part of a convex surface of the third lens are located in a shared space along an optical axis.

2. The lens system according to claim 1,
wherein an entire length LL from the convex surface of the first lens to a convex surface of the fourth lens and a back focus BF satisfy the following condition $0.95 < LL/BF < 1.55$.

3. The lens system according to claim 1,
wherein an outer diameter OD1 of the first lens, an outer diameter OD2 of the second lens, an outer diameter OD3 of the third lens, and an outer diameter OD4 of the fourth lens satisfy the following conditions $0.85 < OD2/OD1 < 1.1$ $0.85 < OD3/OD1 < 1.1$ $0.85 < OD4/OD1 < 1.1$.

4. The lens system according to claim 1,
wherein an entire length LL from the convex surface of the first lens to a convex surface of the fourth lens, a back focus BF, an outer diameter OD1 of the first lens, an outer diameter OD2 of the second lens, an outer diameter OD3 of the third lens, and an outer diameter OD4 of the fourth lens satisfy the following conditions $0.95 < LL/BF < 1.55$ $0.85 < OD2/OD1 < 1.1$ $0.85 < OD3/OD1 < 1.1$ $0.85 < OD4/OD1 < 1.1$.

5. The lens system according to claim 1,
wherein the first lens and the third lens are plastic lenses and the second lens and the fourth lens are glass lenses.

6. A display apparatus comprising:
a lens system according to claim 1; and
an image generating device that generates images to be projected by the lens system.

7. The display apparatus according to claim 6,
wherein the lens system projects the projected light with a tabletop surface or wall surface as a display medium.

8. The display apparatus according to claim 6,
wherein the display apparatus fits onto the palm of the hand.

9. An information processing terminal comprising:
a display apparatus according to claim 6; and
a communication apparatus that is capable of transmitting and receiving data for image generation by the image generating device.

10. The information processing terminal according to claim 9,
wherein the information processing terminal fits onto the palm of the hand.

* * * * *